United States Patent [19]

Crofoot et al.

[11] 4,227,332
[45] Oct. 14, 1980

[54] STONE FLY NYMPH

[76] Inventors: Percy P. Crofoot; James A. Crofoot, both of P.O. Box 130, Silver Lake, Oreg. 97638

[21] Appl. No.: 23,822

[22] Filed: Mar. 26, 1979

[51] Int. Cl.³ .......................................... A01K 85/08
[52] U.S. Cl. .................................. 43/42.25; 43/42.37
[58] Field of Search .................. 43/42.25, 42.26, 42.37

[56] References Cited

U.S. PATENT DOCUMENTS

| | | | |
|---|---|---|---|
| 1,248,390 | 11/1917 | Palmer . | |
| 1,834,277 | 12/1931 | Haberl | 43/42.26 X |
| 1,881,285 | 10/1932 | Means . | |
| 2,034,832 | 3/1936 | Raycraft | 43/42.25 |
| 2,501,723 | 3/1950 | Harvey . | |
| 2,583,942 | 1/1952 | Harvey . | |
| 2,757,476 | 8/1956 | Pender | 43/42.25 |
| 3,421,249 | 1/1969 | Jeffers | 43/42.37 |

*Primary Examiner*—Nicholas P. Godici
*Attorney, Agent, or Firm*—Robert W. Beach; Ward Brown

[57] ABSTRACT

Buoyant porcupine quills secured to the top of a yarn fishing nymph diverge forward to a location beyond the forward end of the yarn body and outward for maintaining the nymph upright with its hooked end substantially directly below the body of the nymph.

8 Claims, 6 Drawing Figures

STONE FLY NYMPH

BACKGROUND OF THE INVENTION

1. Field of the Invention

The present invention relates to a fishing fly or nymph.

2. Prior Art

Known fishing flies or nymphs have very buoyant bodies or other parts to assure that the nymphs always remain on the surface of the body of water being fished; or are weighted to assure that they will sink; or are constructed as to remain on the surface until they become waterlogged. There is a problem with all of these types of nymphs in maintaining the nymph "upright", that is, with the shank of its hook substantially horizontal and the barbed end of its hook substantially directly below the nymph body in the optimum position for hooking fish. For example, floating nymphs having very buoyant parts bob unnaturally on the water surface and often twist and turn as they bob so that the barbed end of the nymph hook may be positioned at the side, or even above, the nymph body when a fish strikes, lessening the chance of hooking the fish. The problem of maintaining a nymph upright with it hook extending downward is even greater for a nymph that sink; particularly when such a nymph is retrieved or trolled, there is no assurance that the nymph remains upright.

Palmer U.S. Pat. No. 1,248,390 discloses an "imitation grasshopper" fishing lure including a cork body and feather shafts secured to the cork body to resemble grasshopper wings and legs.

Harvey U.S. Pat. No. 2,501,723 discloses a fishing lure having a body which is formed partly by wood splints secured beneath a hook shank.

Harvey U.S. Pat. No. 2,583,942 discloses a fishing lure resembling a minnow, the body of which is formed by wood splints secured on top of a hook shank and a weight secured beneath the hook shank. The minnow fins preferably are "made of segments of the shafts of turkey feathers cut to the desired size and shape" (column 2, lines 22 to 23).

Means U.S. Pat. No. 1,881,285 discloses a floating fishing lure including a cork body and "wings" projecting laterally outward from the body and formed of "relatively stiff hair" (page 1, lines 74 to 75). As stated at page 1, lines 31 to 36, "The hair, being hollow, provides buoyancy and my method of treating the hair, as hereinafter described, provides means for controlling the size, shape and appearance of the wings to simulate the various forms of bugs."

No fishing flies or nymphs are known that will remain upright whether on the water surface or below it, or that use porcupine quills secured to the nymph body for flotation.

DETAILED DESCRIPTION

Figure 1:
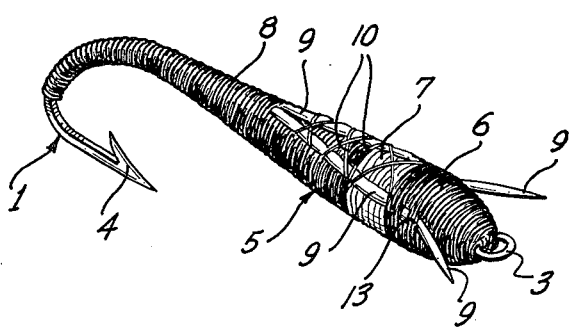
FIG. 1 is a top perspective of a nymph in accordance with the present invention.

As shown in the drawings, a nymph in accordance with the present invention includes a hook 1 having a shank 2, preferably long and straight, ending in an eye 3. The hooked end has a barb 4. Yarn or thread is wrapped about the hook shank or form the nymph body 5. Preferably the nymph body includes a head portion 6 having a blunt forward end immediately adjacent to the hook eye 3 and increasing in diameter rapidly rearward, a short central portion 7 of substantially constant diameter located immediately behind head portion 6 and a long tail portion 8 gradually tapering from its forward end to its rear end almost up to the barbed end 4 of the hook for concealing the hook shank. The diameter of the rear portion of tail portion 8 should be only slightly greater than the diameter of the hook shank so as not to interfere with the fish-hooking effectiveness of the barbed end of the hook.

In the preferred embodiment of the invention, the nymph is made to resemble a stone fly by using black yarn for the head and tail portions 6 and 8, respectively, and by securing imitation antenna members 9 generally to the top of the nymph body 5 with such antenna members projecting forward. Light colored yarn, such as yellow yarn, is used for the nymph central portion 7 to make the nymph more visible.

Figure 5:
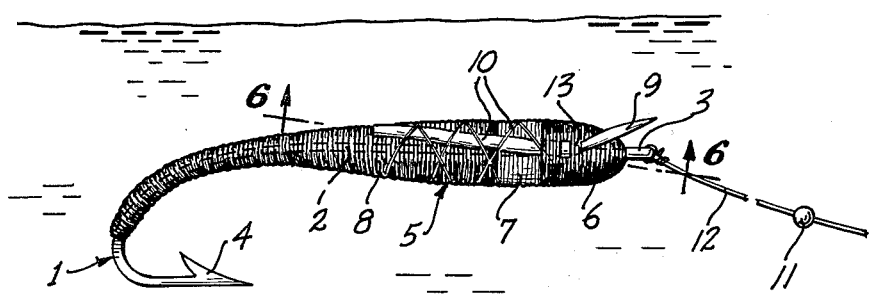
FIG. 5 is a somewhat diagrammatic side elevation of the nymph of FIG. 1 showing the nymph a short distance below the surface of a body of water being fished.
Figure 3:
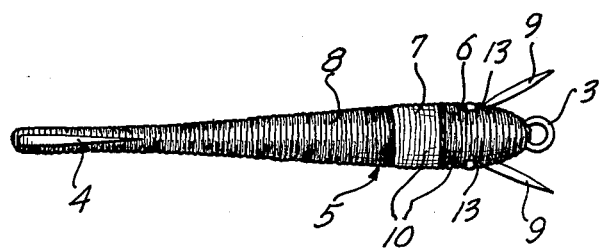

To assure that the nymph will remain upright in use with the shank of the hook substantially horizontal and the barbed end of the hook substantially directly below the nymph body, antenna members 9 are strips of buoyant material secured by criss-crossed yarn wraps 10 to the yarn body in forward and outward diverging relationship. Such strips extend longitudinally over about the forward one-half of the hook shank 2. Such strips should not be so buoyant as to cause the nymph always to remain on the surface of the water being fished, but rather should only be so buoyant as to maintain the nymph upright. For example, as shown in FIG. 5, a conventional weight 11 can be used on the line 12 secured to the hook eye to position the nymph below the water surface. Since the imitation antenna strips 9 provide buoyancy at the front end of the nymph both on top of the nymph and at least a short distance laterally of the nymph, the nymph will remain upright even as it is dragged down by the weight of sinker 11. It is preferred that the forward projecting end portions of the antenna strips 9 be angled upward slightly so that the nymph remains in the same substantially horizontal position even when floating on the surface such as when no sinker is used.

Figure 6:
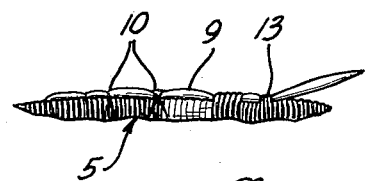
FIG. 6 is an enlarged fragmentary detail taken along line 6—6 of FIG. 5.
Figure 2:
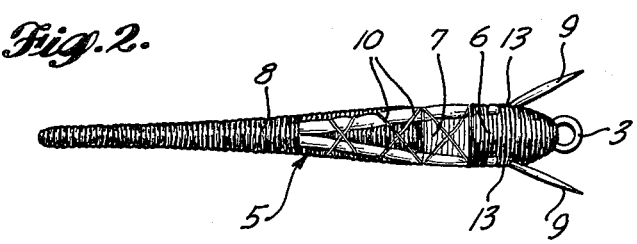
FIG. 2 is a top plan of the nymph of FIG. 1.
Figure 4:
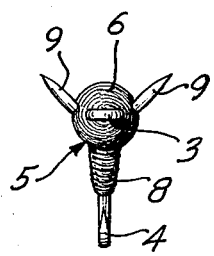
FIG. 3 is a bottom plan thereof and FIG. 4 is a front elevation thereof.

It has been found that the tip portions of porcupine quills are ideal for use as the imitation antenna strips 9. Porcupine quills are buoyant, but not so buoyant as to cause the nymph always to remain on the water surface where it would bob, twist and turn unnaturally. In addition, porcupine quills lend a natural appearance to the antenna members and increase the fish-catching effectiveness of the nymph. Further, as best seen in FIG. 6, porcupine quills are slightly resilient so that the thread wraps 10 securing them to the yarn body indent the quills rather than lying on top of them, leaving a substantially smooth, natural appearing outer surface. Further, the preferred outward diverging relationship of the projecting tips of the antenna members can be effected easily by including several tight wraps 13 of thread or yarn toward the forward end of the quills. Such tight wraps kink the quills and spread them outward as shown in FIGS. 2 and 6. In kinked condition, the projecting tips can be bent upward slightly assuring that the nymph body remains substantially horizontal whether on the water surface or below it.

I claim:

1. In a nymph including a hook having an eye and a yarn body wrapped around the hook shank, the improvement comprising two narrow strips of buoyant material secured outside the yarn body, each of said strips being at least several times greater in length than in width and extending generally longitudinally of and above the hook shank, said strips diverging forward and outward from the hook shank, resembling antennae, and in contact with water when the nymph is placed in water for maintaining the hook with its barbed end substantially directly below its shank.

2. In the nymph defined in claim 1, the nymph body including a head portion adjacent to the hook eye and having a blunt forward end, a central portion of substantially constant diameter located immediately behind said head portion and a tail portion behind said central portion and gradually decreasing in diameter rearward substantially to the rear end of the hook.

3. In the nymph defined in claim 1, tightly wound yarn wraps securing the strips to the yarn body, the strips being slightly resilient so that the yarn wraps indent the strips.

4. In the nymph defined in claim 1, the strips extending over about the forward one-half of the hook shank.

5. In a nymph including a hook and a yarn body wrapped around the hook shank, the improvement comprising two narrow strips of porcupine quill secured outside the yarn body, each of said strips extending generally longitudinally of and above the hook shank, said strips diverging forward and outward from the hook shank for maintaining the hook with its barbed end substantially directly below its shank when the nymph is placed in water.

6. In the nymph defined in claim 5, the tips of the porcupine quills projecting forward beyond the forward end of the yarn body.

7. In the nymph defined in claim 5, the porcupine quills extending over about the forward one-half of the hook shank.

8. In the nymph defined in claim 5, thread wraps securing the porcupine quills to the yarn body, the forwardmost thread wraps being tight for kinking the quills such that their forward tip portions project angularly outward from the nymph body.

* * * * *